(12) United States Patent
Koetz

(10) Patent No.: US 9,966,070 B2
(45) Date of Patent: May 8, 2018

(54) ELECTRICALLY OPERATED DOMESTIC APPLIANCE HAVING A VOICE RECOGNITION DEVICE

(71) Applicant: Vorwerk & Co. Interholding GmbH, Wuppertal (DE)

(72) Inventor: Hendrik Koetz, Wetter (DE)

(73) Assignee: Vorwerk & Co., Interholding GmbH, Wuppertal (DE)

( * ) Notice: Subject to any disclaimer, the term of this patent is extended or adjusted under 35 U.S.C. 154(b) by 0 days. days.

(21) Appl. No.: 15/312,242

(22) PCT Filed: May 5, 2015

(86) PCT No.: PCT/EP2015/059768
§ 371 (c)(1),
(2) Date: Nov. 18, 2016

(87) PCT Pub. No.: WO2015/176950
PCT Pub. Date: Nov. 26, 2015

(65) Prior Publication Data
US 2017/0084275 A1  Mar. 23, 2017

(30) Foreign Application Priority Data

May 21, 2014  (DE) .......................... 10 2014 107 163

(51) Int. Cl.
*G10L 21/00*  (2013.01)
*G10L 15/22*  (2006.01)
(Continued)

(52) U.S. Cl.
CPC ............... *G10L 15/22* (2013.01); *A47J 43/07* (2013.01); *G06K 9/0061* (2013.01);
(Continued)

(58) Field of Classification Search
None
See application file for complete search history.

(56) References Cited

U.S. PATENT DOCUMENTS 9,197,736 B2 *  11/2015  Davis ................... G06F 3/04842
9,318,129 B2 *   4/2016  Vasilieff ................ G10L 25/78
(Continued)

FOREIGN PATENT DOCUMENTS

DE           10210442 A1    9/2003
DE    10 2010 060 650 A1    5/2011
(Continued)

OTHER PUBLICATIONS

International Search Report of PCT/EP2015/059768, dated Aug. 10, 2015.
(Continued)

*Primary Examiner* — Neeraj Sharma
(74) *Attorney, Agent, or Firm* — Collard & Roe, P.C.

(57) ABSTRACT

An electrically operated domestic appliance, in particular a kitchen appliance, includes a voice recognition device, which voice recognition device is designed to compare voice signals of a user with known control commands for operating the domestic appliance, and includes an activation device for activating the voice recognition device. The activation device has an optical detection device, wherein the activation device is designed to activate the voice recognition device in dependence on information captured by the optical detection device. A method operates the domestic appliance.

13 Claims, 1 Drawing Sheet

(51) Int. Cl.
*A47J 43/07* (2006.01)
*G10L 15/28* (2013.01)
*G06K 9/00* (2006.01)
*G10L 15/00* (2013.01)
*G06F 17/27* (2006.01)
*G06Q 30/00* (2012.01)
*A47J 37/12* (2006.01)
*A23L 1/00* (2006.01)
*H04M 3/42* (2006.01)

(52) U.S. Cl.
CPC ..... *G06K 9/00228* (2013.01); *G06K 9/00288* (2013.01); *G10L 15/28* (2013.01); *G10L 2015/223* (2013.01); *G10L 2015/227* (2013.01)

(56) References Cited

U.S. PATENT DOCUMENTS

| | | | | |
|---|---|---|---|---|
| 9,436,683 | B2* | 9/2016 | Klos | G06Q 10/06 |
| 2002/0016734 | A1* | 2/2002 | McGill | G06Q 30/02 |
| | | | | 705/14.39 |
| 2008/0105134 | A1* | 5/2008 | Elston, III | D06F 33/02 |
| | | | | 99/325 |
| 2011/0132201 | A1* | 6/2011 | Richardson | F24C 7/08 |
| | | | | 99/325 |
| 2013/0003490 | A1 | 1/2013 | Kemker et al. | |
| 2013/0216673 | A1* | 8/2013 | Storek | A47J 27/62 |
| | | | | 426/509 |
| 2013/0304479 | A1 | 11/2013 | Teller et al. | |
| 2014/0028826 | A1 | 1/2014 | Lee et al. | |
| 2015/0119003 | A1* | 4/2015 | Park | H04W 4/00 |
| | | | | 455/414.1 |
| 2015/0305566 | A1 | 10/2015 | Koetz | |

FOREIGN PATENT DOCUMENTS

| | | |
|---|---|---|
| EP | 1 215 658 A2 | 6/2002 |
| WO | 2014/083029 A1 | 6/2014 |
| WO | 2015/088141 A1 | 6/2015 |

OTHER PUBLICATIONS

Kleindienst et al: Interaction framework for home environment using speech and vision, Elsevier, ScienceDirect, Image and Vision Computing 25 (2007) 1836-1847.

Heinzmann J et al: "3-D Facial Pose and Gaze Point Estimation using a Robust Real-Time Tracking Paradigm", Automatic Face and Gesture Recognition, 1998. Proceedings. Third IEEE International Conference on NARA, Japan Apr. 14-16, 1998, pp. 142-147.

* cited by examiner

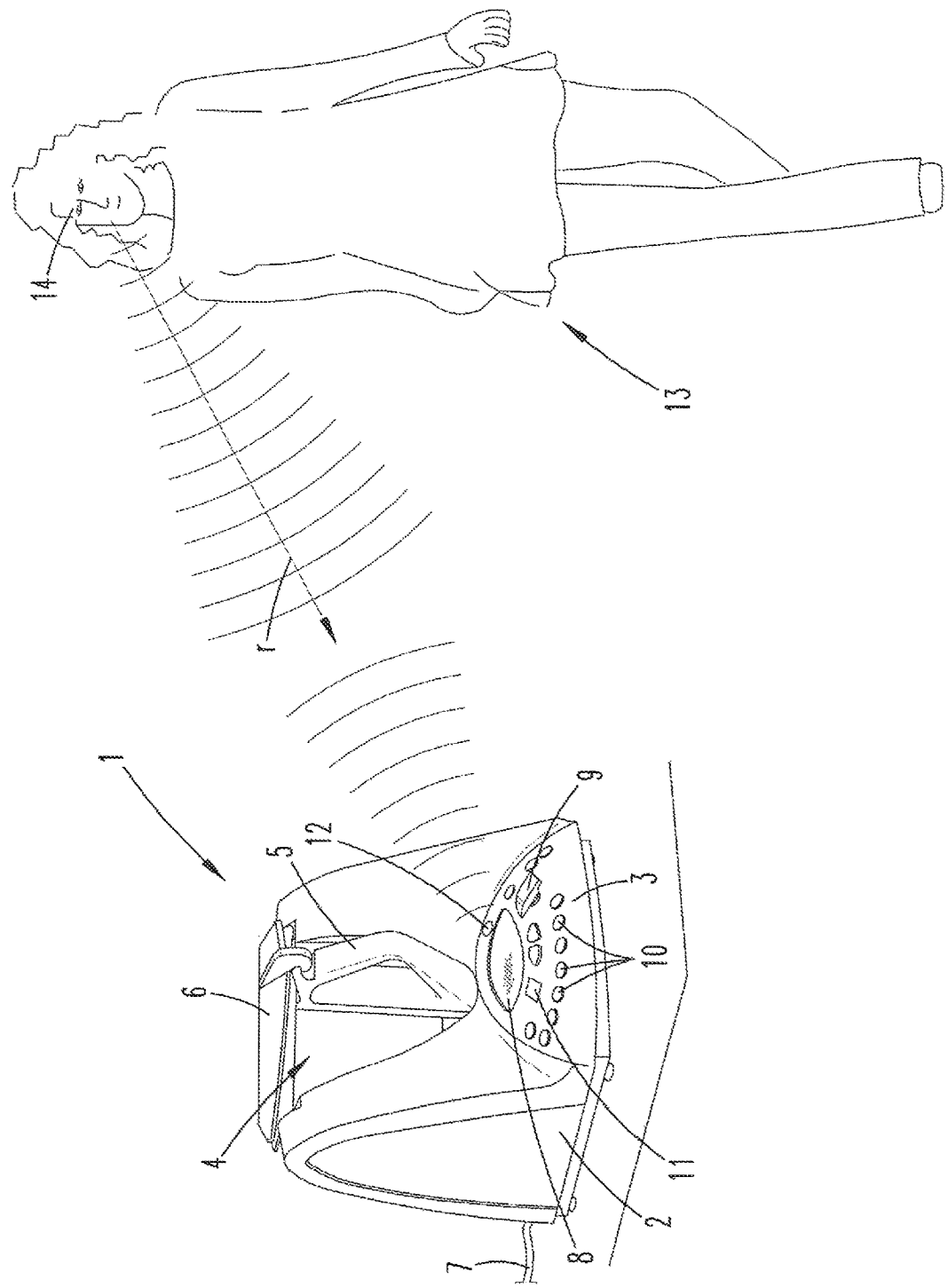

ELECTRICALLY OPERATED DOMESTIC APPLIANCE HAVING A VOICE RECOGNITION DEVICE

CROSS REFERENCE TO RELATED APPLICATIONS

This application is the National Stage of PCT/EP2015/059768 filed on May 5, 2015, which claims priority under 35 U.S.C. § 119 of German Application No. 10 2014 107 163.8 filed on May 21, 2014, the disclosure of which is incorporated be reference. The international application under PCT article 21(2) was not published in English.

The invention relates to an electrically operated domestic appliance, in particular to a kitchen appliance, with a voice recognition device, which is designed to compare voice signals of a user with known control commands for operating the domestic appliance, and with an activation device for activating the voice recognition device.

Domestic appliances, in particular including kitchen appliances, of the aforementioned kind are known in prior art.

For example, publication DE 102010060650 A1 discloses a domestic appliance, specifically a kitchen appliance, to which control commands involving the execution and processing of recipes can be transmitted via a data interface. There can here be a data link between the kitchen appliance and a mobile telephone, for example, which transmits data to the kitchen appliance. In this conjunction, it is further provided that a voice control of the mobile telephone be used to capture control commands of the user.

Further known from prior art is to activate voice recognition devices of mobile telephones with a keystroke. The keystroke starts up a voice recognition software, which can be used to capture the voice signals of the user.

The disadvantage to the aforementioned prior art is that the voice recognition device is activated exclusively by way of a key operation. This is disadvantageous in particular in those situations where the user has dirty or sticky hands, for example while cooking or baking, and can thus only realize the advantages to voice recognition after pressing an activation key. However, this contradicts the actual utility of voice recognition. In addition, it is also disadvantageous that a second voice recognition device, specifically a mobile telephone, is required along with the domestic appliance to use the voice recognition.

Therefore, the object of the invention is to create a domestic appliance with a more convenient activation and use of the voice recognition device, in particular to overcome the aforementioned disadvantageous to prior art.

In order to achieve this object, the invention proposes an electrically operated domestic appliance according to the preamble of the main claim, in which the activation device exhibits an optical detection device, and wherein the activation device is designed to activate the voice recognition device as a function of information captured by means of the optical detection device.

As a consequence, the voice recognition device of the domestic appliance according to the invention can be activated by optically captured information. Key operation is eliminated. The detection device is configured and designed to capture information in the area of the domestic appliance. If the captured information contains a valid optical signal, the voice recognition is activated. The voice recognition device of the domestic appliance can thus be activated completely without touching the domestic appliance or activation device.

It is further proposed that the optical detection device exhibit at least one optical sensor for detecting optical signals, which is situated on the domestic appliance in such a way that it is essentially oriented in the direction of a user. The sensor(s) can be conventional camera chips, for example CCD chips or CMOS chips. The sensor advantageously captures an area in front of the domestic appliance, in which a user is usually located while approaching the domestic appliance.

It is proposed that the optical detection device exhibit an evaluation unit, which is designed to compare signals detected by the optical sensor in chronological sequence. For example, the optical detection device can here capture the optical information in prescribed time intervals, e.g., every tenth of a second, and relay it to the evaluation unit. The evaluation unit compares the chronologically sequential information, and based on changes or differences in the image data can detect a user approaching the domestic appliance, for example.

The optical signals advantageously have information about the orientation of the body of the user, in particular the position of the head or pupils of the user, relative to the domestic appliance.

Aside from being able to conventionally capture the presence of a user in the area of the domestic appliance, this configuration can also enable a directional detection, making it possible to recognize whether the user is facing the domestic appliance, in particular looking at the latter. If the user is looking directly at the domestic appliance, a wish to communicate can be inferred. It can further be inferred that a detected person wishes to use the domestic appliance.

The directional detection advantageously takes place with a suitable software, for example by means of an eye model for analyzing the information captured by the optical detection device.

The proposed directional detection makes it possible to preclude in particular an erroneous triggering of a stored command solely in response to the detection of a person, who does not necessarily have to simultaneously be a user of the domestic appliance, in the capture range of the optical detection device.

The user or potential user of the domestic appliance need not necessarily be looking specifically in the direction of the optical detection device, for example a camera, to be correspondingly detected. Rather, a calculation algorithm is preferably stored, which also considers the viewing direction of at least one eye of the person outside of the capture range of the optical detection device, provided the domestic appliance lies within the resultant viewing field of the user, as further preferred.

Given a correspondingly positive result, the directional detection can (initially) result in the user being greeted, for example. For example, this can be done optically, e.g., further by way of an inscription in a display, or acoustically if the acoustic transducer is preferably set up as a loudspeaker. This greeting can be accomplished via voice output, but additionally or alternatively also via acoustic signals, e.g., in the form of a tone sequence.

Information is captured either continuously or in discrete time intervals with the optical detection device preferably built into the domestic appliance, and further preferably oriented in the direction toward the usual position of the user relative to the domestic appliance. If a person is located in a defined image section and preferably at a defined distance from the device (preferably 0.4 to 2 m, in particular about 1 m), the image is inspected, e.g., an image of the face and/or of at least one eye is extracted, and in particular the viewing direction is evaluated. Recording preferably takes place with a conventional VGA camera, in particular one exhibiting a CCD sensor.

The directional evaluation of the eye in the captured picture is accomplished with a processor preferably integrated into the domestic appliance.

Another embodiment can provide that use can only be made of the domestic appliance along with its functions after a valid direction of the head or pupil of a user located in the capture range of the domestic appliance has been captured. For example, given the detection of a valid viewing direction of the eye, potentially in addition to the detection of the face of an authorized user, the domestic appliance can also be manually operated, i.e., operated via individual adjusting elements, such as speed, temperature and duration actuators.

It is also proposed that it be possible to actuate the directional detection when turning on the domestic appliance. When the domestic appliance is activated, for example by actuating a main switch or inserting a power plug into the power outlet of the household power supply, the domestic appliance is preferably in a so-called standby mode, in which the directional detection is simultaneously activated.

Alternatively, the directional detection is activated only after a command input, in particular from a standby mode of the domestic appliance. In a preferred embodiment, this command input can be achieved by actuating an actuator of the domestic appliance, for example a button or switch.

In addition, it is only possible to deactivate the directional detection after turning off the domestic appliance, e.g., by moving the main switch to an off position or disconnecting the network-side power supply.

The optical detection device can advantageously exhibit a 3D sensor. The 3D sensor is preferably designed to record spatial images. A 3D camera is preferably involved. Alternatively, two optical sensors spaced apart from each other can also be provided, wherein the distance between the sensors usually corresponds to the distance between human eyes. For example, the orientation of the body, head or pupil of a user can be determined by this type of stereoscopic recording and evaluation of optical information.

The software here described above and below for evaluating the picture or pictures is not necessarily provided in the domestic appliance. The latter can also be provided in a computer or hand-held device, such as a mobile telephone, situated outside of the domestic appliance, further preferably accompanied by the use of a radio link, for example. In addition, the evaluation can be performed in a spatially remote computer ("cloud").

Acoustic signals of the user can also be evaluated. To this end, the domestic appliance preferably exhibits an acoustic transducer, in particular in the form of a microphone. The acoustic transducer can enable a recording of sound, and hence also of spoken commands or instructions, for example in the form of digital data.

The acoustic signal is preferably a sound signal of the user, further preferably the spoken word of the user, e.g., in the form of a voice command. A voice command can be standardized, for example encompass one or more keywords prescribed for a function or selection.

In a typical environment of a domestic appliance, which among other things is characterized by acoustic signals from radio or TV broadcasts or human entertainment, misinterpretations can arise solely during an acoustic signal evaluation. In order to prevent this, the acoustic signals can preferably be evaluated as a function of the captured directional detection.

The proposed configuration makes it unnecessary to constantly monitor acoustic signals with the domestic appliance. By establishing a link with directional detection, in particular typical voice commands, such as "faster", "slower", "40°", "stop" or "off" are separated and preferably only used as actual control commands for the domestic appliance given a captured valid direction of the body, head or a pupil of a user.

For example, a captured viewing direction of the eye of the user that corresponds to the specifications leads to a situational activation of the acoustic control, in particular the voice control.

The domestic appliance preferably has a voice recognition software. A work routine of the domestic appliance can be executed as a function of a voice recognition.

Voice control makes it possible to select in particular the control variables, speed, duration and potentially temperature, in particular cooking functions, for example complex cooking processes or recipe selection, by way of an acoustic signal, in particular voice. Although not required, it is nonetheless possible in a preferred embodiment to here touch the domestic appliance, at least in the working condition, and look for corresponding buttons or switches.

Acoustic signal or voice recognition can preferably also be used to select complete recipes from a preferably internal recipe database of the domestic appliance, for example a kitchen appliance, in particular by voice, provided a recipe that is suitable, i.e., assignable to the voice command, or a partial area of a recipe has been filed in a recipe database.

The spoken word or another acoustic signal of the user is converted into electrical signals with an acoustic transducer in the form of an electronic microphone, which is preferably situated in a housing of the domestic appliance, and further preferably in the area of the housing that faces the user during typical operations with the domestic appliance. These signals are preferably processed and analyzed by a digital signal processor (DSP). After a continuous analysis of received acoustic signals and comparison with a previously defined signal list, which further is preferably present in a stored database, the digital signal processor returns the evaluation reflecting the highest probability. A check is initiated to determine which stored signal correlates the most with the received acoustic signal.

In an additional step, a microcontroller preferably analyzes the word present in text form, for example, or the acoustic signal, and translates the latter into a machine command or directly into a recipe, behind which a sequence of machine commands is stored. Finally, the machine command(s) is/are relayed to the controller of the domestic appliance and executed by the latter.

Aside from the domestic appliance described above, the invention finally also proposes a method for operating a domestic appliance, in particular a kitchen appliance, wherein voice signals of a user are detected by means of a voice recognition device and compared with known control commands for operating the domestic appliance, wherein the voice recognition device is activated as a function of an activation event, and wherein the voice recognition device is activated as a function of optical signals in the surrounding area of the domestic appliance detected by means of a detection device. The same features already outlined above relative to the domestic appliance here analogously also apply to the method according to the invention.

The proposed method can advantageously exhibit the following procedural steps:

Detecting at least one optical signal.

Comparing the detected signal with predefined reference signals, and

Activating the voice recognition device if a detected signal corresponds to a predefined reference signal.

As relates to comparing the detected signal with predefined reference signals, it is additionally proposed that several signals and not just one signal be detected in chronological intervals or even continuously by means of the optical detection device. These optical signals can then either each be compared with reference signals, or alternatively with each other. In the latter case, the signals determined at an earlier time themselves serve as reference signals for a signal detected at a later time.

Especially preferred is an embodiment of a method in which an orientation of the body of a user, in particular a head position or pupil orientation of a user, is detected relative to the domestic appliance. The evaluation unit used for directional detection here compares the detected signals, which are images of the body, in particular of the head or pupil, of a user, with reference signals, and activates the voice recognition, device if a detected signal corresponds to a reference signal, which indicates that the user is facing toward the domestic appliance.

The invention is explained in the following based on the attached drawing. The drawing only shows a possible exemplary embodiment of the invention. Shown on:

FIG. 1: is a perspective view of a domestic appliance in the operating position with a user facing toward the domestic appliance.

Shown and described is a domestic appliance 1, specifically a kitchen appliance with a mixing vessel receiver 2 and a control panel 3.

Preferably involved as regards the domestic appliance 1 is a domestic appliance of the kind described in publications DE 10210442 A1 and/or DE 102010060650 A1. The features of these previously known domestic appliances are hereby completely included in the disclosure of the invention, also for the purpose of including features of these domestic appliances in claims of the present invention.

The domestic appliance 1 according to FIG. 1 has allocated to it a mixing vessel 4, wherein the latter is preferably positively inserted into the mixing vessel receiver 2, in particular in the bottom region of the mixing vessel 4.

Provided in the mixing vessel 4 and allocated to the mixing vessel floor is an agitator (not shown), which is operated by an electric motor situated in the domestic appliance 1, underneath the mixing vessel receiver 2. The agitator remains in the mixing vessel 4 even when the latter is removed from the mixing vessel receiver 2, wherein the agitator is further preferably joined with the electric motor in the position allocated by way of a non-rotating plug-in coupling.

The floor of the mixing vessel 4 is preferably heatable so as to heat the cooked food in the mixing vessel 4. An electric resistance heater is here preferably used, and integrated in the floor of the mixing vessel 4.

The mixing vessel 4 is preferably designed like a pot with an essentially circular cross section, with a cross section that conically expands toward the pot opening, i.e., toward the top. The top wall preferably consists of a metal material.

The mixing vessel 4 further exhibits a preferably perpendicularly oriented handle 5, for example which is fixedly secured to the mixing vessel 4 both on the base and at the top edge.

The mixing vessel 4 is preferably allocated to the domestic appliance 1 in such a way that the handle 5 extends freely between the device housing cheeks, facing toward the control panel 3, wherein the base region of the mixing vessel 4 is supported on an integral floor of the domestic appliance 1 in the area of the receiver 2, with the agitator drive and agitator being coupled, and preferably with an electrical contact having been established with the heater on the mixing vessel floor.

The mixing vessel 4 can have placed onto it a vessel cover 6, which is locked in a fitted position, further preferably on the housing of the domestic appliance 1, during operation of the domestic appliance 1, further in particular during operation of the agitator and/or resistance heater on the floor.

A mains connection cable 7 is used to supply electricity to the electric motor, as well as to the heater further preferably provided on the mixing vessel side, and additionally to the electric controller of the entire domestic appliance 1.

A display 8 is preferably initially provided in the control panel 3. The control panel 3 further preferably carries one or more mechanical switches 9, regulators or buttons 10 for setting different control variables, such as the speed of the agitator, the temperature of the heater or a selected time for operating the domestic appliance 1.

The control variables to be set or functions to be retrieved via the switch 9 or buttons 8 can preferably be shown on the display 8.

A recipe database is further preferably stored in the domestic appliance 1. The latter contains a preferably categorized plurality of recipes to be prepared in the domestic appliance 1. Preferably allocated to each recipe are the parameters or control variables relating to the speed of the agitator, temperature of the resistance heater and duration. These control variables are preferably automatically set by the domestic appliance 1 or presented to the user for confirmation upon activation of the recipe sequence.

Preferably also additionally and parallel to operation by way of art acoustic signal, the domestic appliance 1 can be manually operated in a conventional manner, e.g., in particular by actuating the switch 9 and buttons 10.

The domestic appliance 1 is preferably initially enabled for operation, further preferably solely by one or more authorized persons.

The credentials for enabling the domestic appliance 1 and activating the operating functions of the domestic appliance 1 are preferably obtained through voice control in conjunction with direction recognition, for example viewing direction recognition. To this end, the domestic appliance 1 exhibits a voice recognition device (not depicted on the figure), which is designed to compare voice signals from a user 13 with known control commands for operating the domestic appliance 1. In order to activate the voice recognition device, the domestic appliance 1 exhibits an activation device with an optical detection device. The optical detection device exhibits at least one optical sensor 12. The voice recognition device is activated as a function of information captured by means of the optical sensor 12.

The domestic appliance 1 further preferably exhibits a voice recognition software. An acoustic transducer 11 in the form of a microphone is further situated in the area of the control panel 3 so as to interact with the voice recognition software. The microphone along with the optical sensor 12, here for example in the form of an electronic camera, is potentially oriented in the viewing field 3 in the direction toward the user 13 of the domestic appliance 1. The optical sensor 12, here for example in the form of a camera, is used in particular to record evaluable images in conjunction with viewing direction recognition.

In voice recognition, preferably the spoken word, in particular the command word or acoustic pressure resulting therefrom, is converted into electrical signals, and then processed and analyzed by a digital signal processor. Following the continuous analysis of received words and comparison with a previously defined word list within a command database, the signal processor returns the word that coincides with the spoken word with the highest probability. In a further step, a microcontroller analyzes the word present in text form, and translates the latter into a machine command or recipe, or converts the latter in such a way as to specifically retrieve a recipe from the recipe database and show it at least on the display 8.

In a preferred further development, transmitting the machine command to the recipe database automatically presets the parameters accompanying the retrieved recipe or recipe section, such as speed, temperature and time.

In order to avoid misinterpretations of the voice recognition, in particular owing to ambient influences, such as radio, TV, human entertainment, the voice signal controller of the domestic appliance 1 is coupled with a viewing direction recognition device. To this end, the camera 12 and a provided evaluating or analyzing software are used for this purpose.

If the user 13 is in a defined viewing section and at a defined distance, the recorded picture is examined, and an image of at least one eye 14 of the user 13 is extracted, for example. Alternatively, the orientation of the entire body of the user can also be detected and used for evaluation, or even just parts of the body, e.g., the head or the eye, here in particular the pupil.

If the software determines that the viewing direction r of the user 13 is pointing in the direction toward the domestic appliance 1 based on a corresponding analysis, the communication request of the user 13 is taken as the basis, which results in the triggering of the machine command allocated to the voice command.

Voice commands, even voice commands known to the system, which are captured without viewing contact with the domestic appliance 1, preferably to not result in a triggering of a corresponding machine command.

The camera 12 provided in the control panel 3 can also be used in addition to viewing direction recognition to continuously record an image for facial recognition.

In a preferred embodiment, recognition for purposes of contactless control of the domestic appliance 1—which preferably is possible in addition to conventional manual control of the domestic appliance 1—initially requires that the domestic appliance 1 be turned on, in particular activated, for example by means of a main switch. Alternatively, the domestic appliance can be enabled with a specific voice command, preferably in conjunction with viewing direction recognition. The domestic appliance 1 can preferably only be activated overall by capturing a prescribed signal word preferably given a simultaneously captured correct viewing direction r of the eye 14 of the user 13.

REFERENCE LIST

1 Domestic appliance
2 Mixing vessel receiver
3 Control panel
4 Mixing vessel
5 Handle
6 Vessel cover
7 Mains connection cable
8 Display
9 Switch
10 Button
11 Acoustic transducer
12 Sensor
13 User
14 Eye
r Viewing direction

The invention claimed is:

1. An electrically operated food processor, comprising:
a voice recognition device, which is designed to compare voice signals of a user with known control commands for operating the food processor,
an activation device for activating the voice recognition device, wherein the activation device includes an optical detection device having at least one optical sensor for detecting optical signals, and which is arranged on the food processor in such a way as to be aligned essentially in a direction of a user, wherein the activation device is set up to activate the voice recognition device as a function of information acquired by the optical detection device, and
a recipe database stored in the food processor,
wherein the voice recognition device is configured to select complete recipes from the recipe database when a command corresponding to a recipe stored in the database is detected by the voice recognition device,
wherein parameters relating to agitator speed, resistance heating temperature and duration have been allocated to a recipe stored in the database, and
wherein the food processor is configured to automatically set the parameters or present the parameters to the user for confirmation upon activation of a recipe sequence.

2. The food processor according to claim 1, wherein the optical detection device contains an evaluation unit, which is set up to compare chronologically sequential signals detected by the optical sensor to each other.

3. The food processor according to claim 1, wherein the optical sensor is configured to detect signals that exhibit information about the alignment of the body of the user, relative to the food processor.

4. The food processor according to claim 1, wherein the optical sensor is a 3D sensor.

5. The electrically operated food processor according to claim 1, wherein the optical detection device is set up to analyze an image of a face and evaluate the viewing direction.

6. The food processor according to claim 5, wherein the optical sensor is configured to detect optical signals from the user when the user is located in a defined image section and at a distance of between 0.4 and 2 m from the device.

7. The food processor according to claim 5, wherein the food processor is configured to store a calculation algorithm, which considers a viewing direction of at least one eye of the user outside of an acquisition range of the optical detection device if the food processor lies in a viewing field of the user resulting therefrom.

8. The food processor according to claim 5, wherein the optical detection device is configured to continuously record an image for facial recognition.

9. The food processor according to claim 8, wherein the optical detection device is configured to evaluate an image of the face and viewing direction, so that the food processor with its functions is only operable by acquiring a valid direction of the head or pupil of an authorized user present in the acquisition range of the food processor, in which case the food processor is configured to be also be manually operated, once the valid viewing direction of the eye along with the face of an authorized user have been recognized.

10. A method for operating a food processor, having a voice recognition device that is activated by an optical detection device having an optical sensor that senses optical signals in the environment of the food processor, comprising:

storing a recipe database in the food processor, detecting at least one optical signal from a user with the optical detection device, comparing the detected optical signal with predefined reference signals, activating the voice recognition device when the detected optical signal corresponds to a predefined reference signal, detecting voice commands of a user with the activated voice recognition device;

comparing known control commands for operating the food processor with the voice commands, selecting a complete recipe from the recipe database when the voice command corresponds to a recipe that has been stored in the database, allocating parameters relating to agitator speed, resistance heating temperature and duration to the selected recipe, and automatically setting the parameters or presenting the parameters to the user for confirmation upon selection of the recipe.

11. The method according to claim 10, wherein chronologically sequential signals are detected.

12. The method according to claim 10, wherein the predefined reference signal is a signal detected at an earlier time.

13. The method according to claim 10, wherein an alignment of the body of the user relative to the food processor is detected with the optical detection device.

* * * * *